United States Patent
Hawblitzel et al.

(10) Patent No.: US 9,536,093 B2
(45) Date of Patent: Jan. 3, 2017

(54) AUTOMATED VERIFICATION OF A SOFTWARE SYSTEM

(71) Applicant: Microsoft Technology Licensing, LLC, Redmond, WA (US)

(72) Inventors: Chris Hawblitzel, Redmond, WA (US); Bryan Parno, Redmond, WA (US); Jacob R. Lorch, Bellevue, WA (US); Jonathan R. Howell, Seattle, WA (US); Brian D. Zill, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 14/505,204

(22) Filed: Oct. 2, 2014

(65) Prior Publication Data

US 2016/0098562 A1 Apr. 7, 2016

(51) Int. Cl.
*G06F 11/36* (2006.01)
*G06F 21/57* (2013.01)
*G06F 9/45* (2006.01)
*G06F 21/52* (2013.01)

(52) U.S. Cl.
CPC ............... *G06F 21/572* (2013.01); *G06F 8/41* (2013.01); *G06F 11/3604* (2013.01); *G06F 21/52* (2013.01); *G06F 2221/033* (2013.01)

(58) Field of Classification Search
CPC ...................................................... G06F 21/57
USPC ................................................. 703/13; 726/1
See application file for complete search history.

(56) References Cited

U.S. PATENT DOCUMENTS

| | | | | |
|---|---|---|---|---|
| 9,317,682 | B1* | 4/2016 | Kopylov et al. | ........ G06F 21/53 |
| 2006/0041873 | A1* | 2/2006 | Pandarinathan | .......... G06F 8/71 717/141 |
| 2006/0143689 | A1* | 6/2006 | Yu | ....................... G06F 9/44589 726/1 |
| 2007/0285271 | A1 | 12/2007 | Erlingsson et al. | |

(Continued)

FOREIGN PATENT DOCUMENTS

| | | | | |
|---|---|---|---|---|
| IL | WO 2010041258 A1 * | 4/2010 | ............. | G06F 21/54 |
| WO | 2010041258 | 4/2010 | | |

OTHER PUBLICATIONS

Feng et al., "Modular Verification of Assembly Code with Stack-Based Control Abstractions", PLDI'06 Jun. 10-16, 2006 pp. 401-414.*

(Continued)

*Primary Examiner* — Izunna Okeke
*Assistant Examiner* — Hee Song
(74) *Attorney, Agent, or Firm* — Alin Corie; Sandy Swain; Micky Minhas

(57) ABSTRACT

Software code of a software system (e.g., a software stack) may be verified as conforming to a specification. A high-level language implementation of the software system may be compiled using a compiler to create an assembly language implementation. A high-level specification corresponding to the software system may be translated to a low-level specification. A verifier may verify that the assembly language implementation functionally conforms to properties described in the low-level specification. In this way, the software system (e.g., a complete software system that includes an operating system, device driver(s), a software library, and one or more applications) may be verified at a low level (e.g., assembly language level).

20 Claims, 10 Drawing Sheets

(56) References Cited

U.S. PATENT DOCUMENTS

| | | | | | |
|---|---|---|---|---|---|
| 2008/0263506 | A1* | 10/2008 | Broadfoot | ................. | G06F 8/10 717/104 |
| 2008/0271001 | A1* | 10/2008 | Nonomura | ............ | G06F 21/125 717/143 |
| 2009/0164193 | A1* | 6/2009 | McMillan | ........... | G06F 17/5022 703/13 |
| 2011/0276934 | A1* | 11/2011 | Koelbl | ................. | G06F 17/504 716/108 |
| 2012/0266213 | A1 | 10/2012 | Spiers et al. | | |
| 2014/0033272 | A1 | 1/2014 | Harris et al. | | |

OTHER PUBLICATIONS

Rauzy et al., "Formally Proved Security of Assembly Code Against Leakage", pp. 1-26, https://eprint.iacr.org/2013/554.pdf, 2013.*

Song et al., "BitBlaze: A New Approach to Computer Security via Binary Analysis", pp. 1-25, ICISS 2008, LNCS 5352 2008.*

Adams, Scott, "Tour of Accounting", retrieved on Aug. 1, 2014 at http://dilbert.com/strips/comic/.

Ali, et al., "Scalable Remote Attestation with Privacy Protection", Proceedings of the First international conference on Trusted Systems, Dec. 17, 2009, 15 pages.

Alkassar, et al., "Balancing the Load: Leveraging a Semantics Stack for Systems Verification", Journal of Automated Reasoning, vol. 42, No. 2, Apr. 2009, 60 pages.

"AMD64 Architecture Programmers Manual", Advanced Micro Devices, May 2013, 386 pages.

Balacheff, et al., "Trusted computing platforms TCPA technology in context", Prentice Hall, Aug. 1, 2014, 1 page.

Barnett, et al., "Boogie: A Modular Reusable Verifier for Object-Oriented Programs", Proceedings of the 5th international conference on Formal Methods for Components and Objects, Nov. 7, 2006, 24 pages.

Barthe, et al., "Computer-Aided Security Proofs for the Working Cryptographer", Proceedings of the 31st annual conference on Advances in cryptology, Aug. 14, 2011, 17 pages.

Barthe, et al., "Probabilistic Relational Reasoning for Differential Privacy", Proceedings of the 39th annual ACM SIGPLAN-SIGACT symposium on Principles of programming languages, Jan. 25, 2012, 13 pages.

Barthe, et al., "Probabilistic Relational Verification for Cryptographic Implementations", Proceedings of the 41st ACM SIGPLAN-SIGACT Symposium on Principles of Programming Languages, Jan. 22, 2014, 13 pages.

Barthe, et al., "Secure Information Flow by Self-Composition", Proceedings of the 17th IEEE Computer Security Foundations Workshop, Jun. 28, 2004, 15 pages.

Benton, Nick, "Simple relational correctness proofs for static analyses and program transformations", Proceedings of the 31st ACM SIGPLAN-SIGACT Symposium on Principles of Programming Languages, Jan. 14, 2004, 12 pages.

Bhargavan, et al., "Implementing TLS with Verified Cryptographic Security", IEEE Symposium on Security and Privacy, May 19, 2013, 15 pages.

Bruschi, et al., "Replay Attack in TCG Specification and Solution", Proceedings of the 21st Annual Computer Security Applications Conference, Dec. 5, 2005, 11 pages.

Cachin, Christian, "Distributing Trust on the Internet", International Conference on Dependable Systems and Networks, Jul. 1, 2001, 10 pages.

Carbonneaux, et al., "End-to-End Verification of Stack-Space Bounds for C Programs", Proceedings of the 35th ACM SIGPLAN Conference on Programming Language Design and Implementation, Jun. 9, 2014, 12 pages.

Dam, et al., "Formal Verification of Information Flow Security for a Simple Arm-Based Separation Kernel", Proceedings of the 2013 ACM SIGSAC conference on Computer & communications security, Nov. 4, 2013, 12 pages.

Datta, et al., "A Logic of Secure Systems and its Application to Trusted Computing", Proceedings of the 30th IEEE Symposium on Security and Privacy, Jun. 1, 2009, 50 pages.

Denning, Dorothy Elizabeth Robling, "Secure Information Flow in Computer Systems", Doctoral Dissertation, Jul. 31, 2014, 1 page.

Drzevitzky, Stephanie, "Proof-Carrying Hardware: Runtime Formal Verification for Secure Dynamic Reconfiguration", International Conference on Field Programmable Logic and Applications, Aug. 31, 2010, pp. 255-258.

Dwork, et al., "Calibrating Noise to Sensitivity in Private Data Analysis", Proceedings of the Third conference on Theory of Cryptography, Mar. 4, 2006, 20 pages.

Dwork, Cynthia, "Differential Privacy", Preceedings of 33rd International Colloquium on Automata, Languages and Programming, part II, Jul. 2006, 12 pages.

Fahndrich, et al., "Language Support for Fast and Reliable Message-based Communication in Singularity OS", In Proceedings of the EuroSys Conference, Apr. 18, 2006, 14 pages.

Feng, et al., "Modular Verification of Assembly Code with Stack-Based Control Abstractions", Proceedings of the ACM SIGPLAN conference on Programming language design and implementation, Jun. 11, 2006, 14 pages.

Fraim, Lester J., "SCOMP: A Solution to the Multilevel Security Problem", Computer Journal, vol. 16 Issue 7, Jul. 1983, 8 pages.

Ghosh, et al., "An End to End Correctness Verification Approach for Application Specific Usage Control", Fourth International Conference on Industrial and Information Systems, Dec. 28, 2009, 6 pages.

Ghosh, et al., "Universally Utility-Maximizing Privacy Mechanisms", Proceedings of the forty-first annual ACM symposium on Theory of computing, May 31, 2009, 9 pages.

Goguen, et al., "Security Policies and Security Models", Proceedings of IEEE Symposium on Security and Privacy, Apr. 1982, 10 pages.

Gold, et al., "KVM/370 in Retrospect", IEEE Symposium on Securityand Privacy, Apr. 1984, pp. 13-23.

Gurgens, et al., "Security evaluation of scenarios based on the TCG's TPM Specification", Proceedings of 12th European Symposium on Research in Computer Security, Sep. 24, 2007, 16 pages.

Haber, et al., "How to Time-Stamp a Digital Document", Journal of Cryptography, vol. 3, No. 2, Jan. 1, 1991, pp. 0-12.

Haeberlen, et al., "Differential Privacy Under Fire", Proceedings of the 20th USENIX conference on Security, Aug. 8, 2011, pp. 1-15.

Hunt, et al., "Singularity: Rethinking the Software Stack", ACM SIGOPS Operating Systems Review, Apr. 1, 2007, 13 pages.

Jaeger, et al., "PRIMA: Policy-Reduced Integrity Measurement Architecture", Symposium on Access Control Models and Technologies, Jun. 7, 2006, 10 pages.

Kaliski, B., "PKCS #1: RSA Encryption, Version 1.5", Technical Report RFC 2313, Mar. 1998, pp. 1-19.

Karger, et al., "A Retrospective on the VAX VMM Security Kernel", IEEE Transactions on Software Engineering, vol. 17, No. 11, Nov. 1991, pp. 1147-1165.

Klein, et al., "seL4: Formal Verification of an OS Kernel", Proceedings of the ACM SIGOPS 22nd symposium on Operating systems principles, Oct. 11, 2009, pp. 207-220.

Lahiri, et al., "SymDiff: A language-agnostic semantic diff tool for imperative programs", In Proceedings of the 24th international conference on Computer Aided Verification, Jul. 7, 2012, 7 pages.

Lamport, Leslie, "Specifying Systems: The TLA+ Languange and Tools for Hardware and Software Engineers", Addison-Wesley Professional; 1 edition, Jun. 18, 2002, 382 pages.

Leino, K. Rustan M., "Dafny: An Automatic Program Verifier for Functional Correctness", Proceedings of the 16th international conference on Logic for programming, artificial intelligence, and reasoning, Apr. 25, 2010, 19 pages.

Levin, et al., "Trlnc: Small Trusted Hardware for Large Distributed Systems", Proceedings of the 6th USENIX symposium on Networked systems design and implementation, Apr. 22, 2009, 14 pages.

Marchesini, et al., "Open-Source Applications of TCPA Hardware", Proceedings of the 20th Annual Computer Security Applications Conference, Dec. 6, 2004, 10 pages.

(56) References Cited

OTHER PUBLICATIONS

Mazurek, et al., "Measuring Password Guessability for an Entire University", Proceedings of the ACM SIGSAC Conference on Computer & Communications Security, Nov. 4, 2013, pp. 173-186.
McCune, et al., "Flicker: An Execution Infrastructure for TCB Minimization", Proceedings of the 3rd ACM SIGOPS/EuroSys European Conference on Computer Systems, Apr. 1, 2008, pp. 315-328.
Millen, et al., "Analysis of a Measured Launch", Technical Report 07-0843, Jun. 5, 2007, pp. 1-14.
Miller, Gary L., "Riemann's Hypothesis and Tests for Primality", Journal of Computer and System Sciences, vol. 13, Issue 3, Dec. 1976, pp. 234-239.
Mironov, Ilya, "On Significance of the Least Significant Bits for Differential Privacy", Proceedings of the ACM Conference on Computer and Communications Security, Oct. 16, 2012, pp. 1-18.
Moura, et al., "Z3: An Efficient SMT Solver", Proceedings of the Theory and Practice of Software, 14th International Conference on Tools and Algorithms for the Construction and Analysis of Systems, Mar. 29, 2008, 4 pages.
Murray, et al., "seL4: from General Purpose to a Proof of Information Flow Enforcement", Proceedings of IEEE Symposium on Security and Privacy, May 19, 2013, pp. 415-429.
"National Vulnerability Database", retrieved on Aug. 1, 2014, at http://web.nvd.nist.gov/view/vuln/detail? vulnId=CVE-2014-0160, National Institute of Standards and Technology, published on Apr. 7, 2014, pp. 1-6.
Parno, et al., "Bootstrapping Trust in Modern Computers", Proceedings of Springer Briefs in Computer Science, Aug. 28, 2011, 111 pages.
Parno, Bryan, "Bootstrapping Trust in a 'Trusted' Platform", In Proceeding of 3rd USENIX Workshop on Hot Topics in Security, Jul. 29, 2008, 6 pages.
Qiu, et al., "Trusted Computer System Evaluation Criteria", National Computer Security Center, Dec. 1985, 116 pages.
Rabin, Michael O., "Probabilistic Algorithm for Testing Primality", Journal of Number Theory, vol. 12, Issue 1, Feb. 1980, pp. 128-138.
Reed, et al., "Distance Makes the Types Grow Stronger: A Calculus for Differential Privacy", Proceedings of the 15th ACM SIGPLAN International Conference on Functional Programming, Sep. 27, 2010, pp. 157-168.
Roy, et al., "Airavat: Security and Privacy for MapReduce", Proceedings of the 7th USENIX Conference on Networked Systems Design and Implementation, Apr. 28, 2010, pp. 1-16.
Sabelfeld, et al., "Language-Based Information-Flow Security", IEEE Journal on Selected Areas in Communications, vol. 21, Issue 1, Jan. 2003, pp. 1-15.
Sailer, et al., "Design and Implementation of a TCG-based Integrity Measurement Architecture", Proceedings of the 13th USENIX Security Symposium, Aug. 9, 2004, 17 pages.
Schellekens, et al., "Remote Attestation on Legacy Operating Systems With Trusted Platform Modules", In Electronic Notes in Theoretical Computer Science, Dec. 1, 2008, 14 pages.
Schockley, et al., "An Overview of the Gemsos Class A1 Technology and Application Experience", Proceedings of the 11th National Computer Security Conference, Oct. 1988, 1 pages.
"Secure Hash Standard (SHS)", Federal Information Processing Standards Publication 180-4, Mar. 2012, 35 pages.
"Securing the Windows 8 Boot Process", retrieved on Aug. 1, 2014, at http://technet.microsoft.com/en-us/windows/dn168167.aspx.
Seshadri, et al., "Pioneer: Verifying Code Integrity and Enforcing Untampered Code Execution on Legacy Systems", Proceedings of the twentieth ACM symposium on Operating systems principles, Oct. 23, 2005, 16 pages.
Stubblebine, et al., "Fair On-line Auctions Without Special Trusted Parties", Proceedings of the Third International Conference on Financial Cryptography, Feb. 1, 1999, 11 pages.
"The Keyed-Hash Message Authentication Code (HMAC)", In Federal Information Processing Standards Publication FIPS PUB 198-1, Jul. 2008, 13 pages.
"Trusted Computing: An Already Deployed, Cost Effective, ISO Standard, Highly Secure Solution for Improving Cybersecurity", Wave Systems Corp. response to Department of Commerce Internet Policy Task Force Notice of Inquiry Section 4. Authentication/Identity (ID) Managment, Jul. 28, 2010, 24 pages.
Uppal, et al., "Trusted Platform Modules: Building a Trusted Software Stack and Remote Attestation", retrieved on Jul. 30, 2014, at http://courses.cs.washington.edu/courses/cse550/10au/other_for_site/cse551_final_paper_draft5_final.pdf.
Yang, et al., "Safe to the Last Instruction: Automated Verification of a Type-Safe Operating System", Proceedings of the ACM SIGPLAN Conference on Programming Language Design and Implementation, Jun. 5, 2010, 12 pages.
Zeldovich, et al., "Making Information Flow Explicit in HiStar", Proceedings of 7th USENIX Symposium on Operating Systems Design and Implementation, vol. 7, Nov. 6, 2006, pp. 263-278.
PCT International Search Report and Written Opinion for Application No. PCT/US2015/053408, mailed on Dec. 7, 2015 (12 pages).
Baumann, et al., "Ingredients of Operating System Correctness, Lessons Learned in the Formal Verification of PikeOS", Saarland University, Department of Computer Science, Saarbrucken, Germany, 2010 (14 pages).
PCT Written Opinion of the International Preliminary Examining Authority for PCT application No. PCT/US2015/053408, (6 pages).

\* cited by examiner

800 ⬉

```
PERFORM A PRELIMINARY VERIFICATION TO VERIFY THAT A HIGH-LEVEL LANGUAGE
IMPLEMENTATION CONFORMS TO A HIGH-LEVEL SPECIFICATION
802
```
↓
```
COMPILE THE HIGH-LEVEL LANGUAGE IMPLEMENTATION TO CREATE AN ASSEMBLY
LANGUAGE IMPLEMENTATION
804
```
↓
```
TRANSLATE A HIGH-LEVEL SPECIFICATION TO A LOW-LEVEL SPECIFICATION
806
```
↓
```
VERIFY THAT THE ASSEMBLY LANGUAGE IMPLEMENTATION CONFORMS TO SOFTWARE
PROPERTIES SPECIFIED IN THE LOW-LEVEL SPECIFICATION
808
```
↓
```
CREATE, USING AN ASSEMBLER, A MACHINE CODE IMPLEMENTATION BASED ON THE
ASSEMBLY LANGUAGE IMPLEMENTATION
810
```

FIG. 8

AUTOMATED VERIFICATION OF A SOFTWARE SYSTEM

BACKGROUND

When a user submits personal data to a remote service (e.g., cloud-based service), there is no guarantee that the personal data will remain secure or even that the service will produce correct results. At best, the service may have a privacy policy and limit the liability of the service in case of a data breach. However, recent headlines have provided examples of how vulnerability in an operating system, a library, or an application (e.g., software application) may enable personal data to be accessed.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations may include techniques to verify that software code conforms to a corresponding specification. A high-level language implementation of a software system may be compiled using a compiler to create an assembly language implementation. The software system may have a corresponding high-level specification. The high-level specification, which may be expressed as a finite state machine, may be translated to a low-level specification. The properties of the assembly language implementation may be verified as conforming to the low-level specification. In this way, the correctness of a system as a whole (e.g., the complete software stack) may be verified at a low level (e.g., assembly language level).

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 is a flow diagram of an example process that includes verifying that the properties of the software code conform to a corresponding specification according to some implementations.

DETAILED DESCRIPTION

Figure 1:
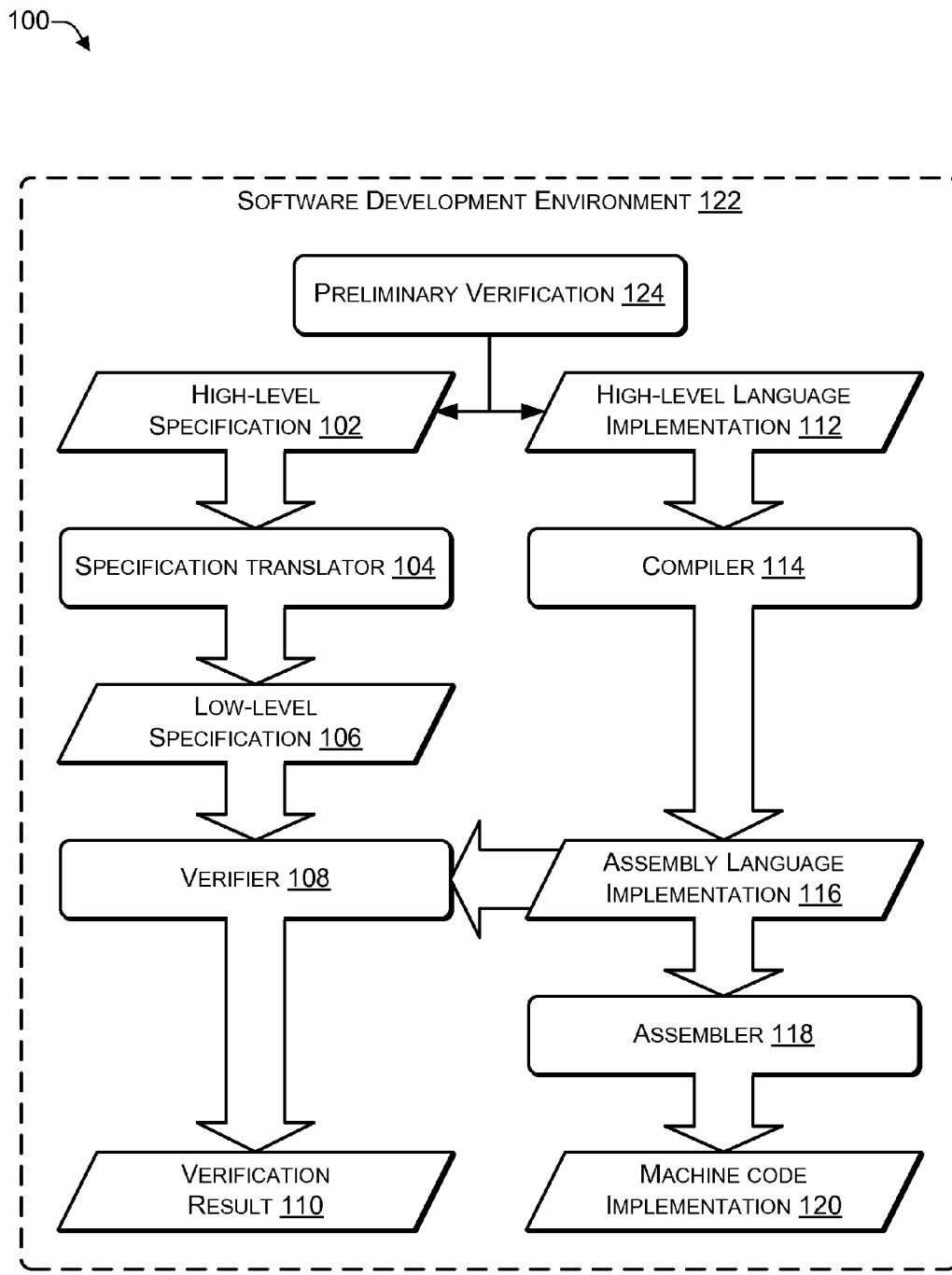
FIG. 1 is an illustrative architecture that includes a specification translator according to some implementations.

Theoretically, a complete formal verification of a service's software code may provide a mathematical guarantee that the service precisely matches a formally specified security standard. Unfortunately, while software verification may provide a strong guarantee about the trustworthiness of software code, the computational cost may be so high that service providers may be unable to perform software verification of their entire system. As a result, service providers at most may provide strong guarantees about small programs written in a high-level language that are surrounded by large quantities of unverified software code. For example, a verified transport layer security protocol implementation may rely on an unverified operating system and unverified software libraries. As another example, a machine-checked proof of correctness for an RSA cryptosystem may assume the correctness of the crypto libraries that implement the RSA cryptosystem, the corresponding runtime libraries, and the operating system. As a further example, a microkernel that relies on a trusted assembly code may make no claims as to the correctness of application-level semantics. Thus, a service may be unable to perform a complete formal verification of the service's software code and may therefore be unable to provide a mathematical guarantee that the service precisely matches a formally specified security standard.

The systems and techniques described herein may be used to create applications that have been verified as end-to-end secure, such that the verification covers all of the software code ("code") that may be executed, e.g., the code that has been verified includes not just the applications but also the operating system, the libraries (runtime libraries, program libraries, dynamic libraries), and the drivers that may be executed. Thus, in some examples, no assumptions need be made that any portion of the software executing on one or more servers is correct. The code that undergoes verification is the assembly code that gets executed, rather than any high-level language(s) in which the code may be written. The verification process may assume that the hardware is correct, but makes no assumption regarding the correctness of the compiler or the runtime execution of the code. The verification process may thus demonstrate that the entire system implements a functionally correct version of a high-level abstract state machine of the code. The verification process may demonstrate secure remote equivalence, e.g., that a remote user can establish a secure channel to code whose outputs cannot be distinguished from the output of the high-level abstract state machine.

Verifying that the code executing on the server(s) is functionally correct and demonstrating the remote equivalence may enable the verification process to provide a full specification and proof for the entire system's behavior, detailing how the system (e.g., software code and hardware) will behave in every possible situation. Proving remote equivalence may incorporate (i) proving the functional correctness of properties and (ii) proofs of noninterference, which involves proving relational properties of code (e.g., properties about how two runs of the same code with different inputs relate to one another). In addition, remote equivalence can be strengthened to provide secure remote equivalence via Trusted Computing (e.g., as specified by the Trusted Computing Group, an international industry standards group that develops and publishes specifications for implementation by the industry). For example, secure hardware, such as a Trusted Platform Module (TPM), may be used to certify (e.g., via an attestation) that a public key corresponds to a private key that is known only to the code that is being executed on the server(s). A remote user may use the public key to create a secure channel to the code, thereby achieving security commensurate with direct communication with the code's abstract state machine. Combining attestation with fully verified code may thus provide an extremely high assurance of end-to-end security.

The techniques and systems described herein may enable software developers to develop verifiably secure applications with modest developer effort compared to using conventional techniques. For example, conventional techniques may typically take tens of person-years to verify a single software layer, so verifying a complete software stack (e.g., applications, operating system, drivers, and the like) using conventional techniques may be computationally prohibitive. To reduce developer effort, the techniques and systems described herein may be used to perform fast, automated, end-to-end software verification of systems software.

To verify code correctly at the assembly level (e.g., with modest developer effort), a software developer may use two new tools that are described herein. First, a specification translator may enable a software developer to write specifications efficiently in a high-level language and then verify that the corresponding assembly code meets the specifications. For example, the specification translator may translate a high-level specification (e.g., finite state machine) to a low-level specification to enable the verification to be performed. Second, a compiler that compiles verifiable code in a high-level language to verifiable assembly language may be used to translate both the code and the corresponding proofs from a high-level language to low-level assembly code (or machine code). Such a compiler may enable a software developer to quickly write and check high-level code and prove properties associated with the executable assembly code. For example, the software for an entire system (or any subset thereof), including applications, libraries, drivers, and operating system, may be compiled to a single program that is comprised of verifiable assembly code. The correctness of the entire system code (e.g., as a whole) is verified, such that there is no unverified code in the entire system code and there are no unverified gaps between the different components of the system. As an example of a gap, suppose a first component X is described as performing Q, and a second component Y is described as performing R using another component (X) that does Q. If X means something different by Q than Y does, then Y's guarantee that Y performs R might not hold, thereby creating a gap. The verification process verifies that there are no unverified gaps between two (or more) components of the system.

In addition, the verification process verifies that each component of the system is incapable of subverting the specification of another component of the system. For example, an application may be verified to not subvert the operating system's memory management subsystem, and the operating system's memory management subsystem may be verified to not subvert the application.

In addition, the system and techniques described herein include verification tools that provide incremental verification, opaque functions, and automatic requirement generation. In addition to the verification tools, provably correct libraries for manipulating arrays of bits, bytes, and words, tools for proving mathematical statements common in systems programming (e.g., reasoning about how values grow when transforming bytes to words), and tools for cryptographic operations, such as encryption (e.g., RSA Optimal Asymmetric Encryption Padding (OAEP)), signing (e.g., RSA Probabilistic Signature Scheme (PSS)), authenticating (e.g., hash message authentication code (HMAC)), and hashing (e.g., Secure Hash Algorithm (SHA)) are described herein.

Several software applications, each useful as a standalone service, are provided as examples of verifiable software code. For example, a notary application to securely assign logical timestamps to objects (e.g., files, documents, etc.) so that they can be conclusively ordered is described. The notary application includes a state that includes a monotonically increasing counter, and that responds to notarization requests by incrementing the counter, signing (e.g., using a signature) a statement linking the counter value to the request, and replying with the statement and the signature. The other three applications include a password hasher, a trusted counter for use by multiple users, and a differentially-private database that maximizes the accuracy of queries to databases while minimizing the chances of identifying the records of the databases.

Thus, techniques and systems are described below with reference to the accompanying figures that provide, via automated full-system verification, externally checkable, fully verified software at the assembly level. A collection of example tools, techniques, and software engineering disciplines for building relatively large-scale end-to-end verified systems are also described. In addition, an example approach to proving information-flow-based security properties of assembly-level code via verification of relational properties and example techniques for systems developers to use for formal verification.

Illustrative Architectures

FIG. 1 is an illustrative architecture 100 that includes a specification translator according to some implementations. In some implementations, the architecture 100 may be used to provide remote equivalence and end-to-end verification.

Remote equivalence provides an assurance regarding the equivalence between each application and its corresponding state machine. For example, a remote device communicating with an application over an untrusted network may be assured of receiving the same sequence of messages as the remote device would receive communicating with a corresponding (e.g., corresponding to the application) state machine over an untrusted network. For example, a notary application's specification may indicate that the notary application signs a monotonically increasing counter. Knowing that the system matches this specification, a remote device may be provided an assurance that, for example, a running system (i) does not allow the counter to roll back, (ii) does not share a private key, (iii) does not provide signed statements for anything except notarizations, (iv) computes the signature correctly, and (v) is not susceptible to buffer overflows, integer overflows, or other implementation-level vulnerabilities.

The architecture 100 may enable a remote device to establish a secure channel to an application. Establishing a secure channel to an application may eliminate the ability of an untrusted network to interfere with communications between the remote device and the application. For example, the notary application's specification may state that the notary application computes key-pairs using randomness from a trusted platform and then obtains an attestation of the public key and the application's code from the trusted platform. Thus, a remote device receiving the attestation may determine that notarizations signed with the corresponding private key were generated on the trusted platform by the notary application's code and can therefore be treated as if the notarizations signed with the corresponding private key were generated by a state machine corresponding to the notary application.

In addition to security assurances, no implicit trust is placed in any software applications that run on the system. Thus, every software component is either (i) verified as being secure or (ii) executed in a verified sandbox environment that prevents the software component from affecting the security of other components of the system.

In addition, rather than merely independently verify each component in a system, the entire system as a whole may be verified. By doing so, the security of the system may avoid incorrect assumptions about how the software components of the system interact. No implicit trust is placed in the compiler used to generate the software that is to be executed. Thus, the instructions (e.g., assembly code) to be executed are verified rather than merely the high-level source code that will be compiled to create the instructions.

The code for the system may be written in a language that is designed to support verification (e.g., rather than in a conventional computer language). When designing the code, algorithms and code patterns that facilitate proofs of correctness (e.g., rather than performance) may be selected to provide a system that is easily verifiable. The code may be optimized without worrying that the optimizations may introduce bugs because the verification tools are designed to catch any errors that might be introduced by the optimization techniques.

The verified system may provide security against software-based attacks. For example, an adversary may execute software on a server before a verified application executes and/or after the verified application terminates. The adversary may compromise the server's firmware, basic input/output system (BIOS), or a peripheral device, (e.g., a network card). In some cases, the system may assume that the central processing unit (CPU), memory, chipset, and trusted platform module are behaving correctly, and assumes that the adversary does not mount a physical attack (e.g., electrically probing the memory bus, etc.).

The architecture 100 may include a high-level specification 102, a specification translator 104, a low-level specification 106, a verifier 108, a verification result 110, a high-level language implementation 112, a compiler 114, an assembly language implementation 116, assembler 118, and a machine code implementation 120. For example, a user may create the high-level specification 102 and the high-level language implementation 112. The specification translator 104 may translate the high-level specification 102 (e.g., a finite state machine) into a low-level specification 106.

The compiler 112 may compile the high-level language implementation 112 into the assembly language implementation 114. The verifier 108 may automatically (e.g., without human interaction) perform various functions, such as verifying that the assembly language implementation 116 corresponds to the low-level specification 106. After the assembly language implementation 114 has been verified by the verifier 108 as corresponding to the low-level specification 106, the assembly language implementation 116 may be converted by the assembler 118 into executable code in the form of the machine code implementation 116. Assembly language is an example of a low-level language for a computer, or other programmable device, in which there is generally a one-to-one correspondence between the assembly language and the machine code instructions that are executed by the hardware processors.

A verification stack (e.g., based on Floyd-Hoare or similar reasoning) may be used to prove the functional correctness of code. The high-level specification 102 and the high-level language implementation 112 may be implemented using a high-level language that is designed to be verifiable. The high-level language may have built-in specification constructs. The verifier 108 may be a static program verifier that may be used to verify the functional correctness of software programs written in the high-level language. The high-level language may be designed to support the static verification of programs. The high-level language may include various features, such as being imperative, sequential, support generic classes, provide dynamic allocation and inductive data types, and have built-in specification constructs. The high-level language specification may enable a user to specify pre-conditions, post-conditions, frame specifications (read and write sets), and termination metrics. The high-level language may provide updatable ghost variables, recursive functions, and types, such as sets and sequences. Specifications and ghost constructs may be used by the verifier 108 during verification and may be omitted by the compiler 114 when the compiler 114 is creating the assembly language implementation 116.

In some implementations, the verifier 108 may be run as part of the compiler 114. The programmer may interact with the verifier 108 in a manner similar to a static type checker, e.g., when the verifier 108 produces errors, the programmer may respond by changing one or more of the type declarations, specifications, or statements in the high-level implementation 112. The verifier 108 may automatically fill in low-level proof details.

The compiler 114 may take the high-level language implementation 112 corresponding to the high-level specification 102 and automatically (e.g., without human interaction) translate the high-level language implementation 112 to the verifiable assembly language implementation 116. The assembly language implementation 116 may use an Intermediate Verification Language (IVL) for describing proof obligations to be discharged by a reasoning engine, such as a Satisfiability Modulo Theories (SMT) solver. The IVL may include a verification engine (e.g., the verifier 108) that takes the assembly language implementation 116 as input, generates verification conditions (VCs) for the proof obligations, and passes the VCs to a reasoning engine. The code for an entire system may be verified at the assembly level (e.g., the assembly language implementation 116) using the verifier 108. Any bugs in the high-level language implementation 112 or in the compiler 114 may be identified by the verifier 108. Because some security properties cannot be expressed via functional correctness, techniques are described for verifying relational properties of code (e.g., the high-level language implementation 112). When the verification result 110 indicates that the assembly language implementation 116 has been verified as correct, the trusted assembler 118 may be used to convert the assembly language implementation 116 to the machine code implementation 120 (e.g., executable code).

Verifying Code Using Reasoning

The verifier 108 may use a type of reasoning (e.g., Floyd-Hoare reasoning or other similar reasoning) to perform verification of the assembly language implementation 116. The high-level language implementation 112 may be annotated with assertions regarding the states that the program may enter, and the verification process may prove that the assertions are valid when the program is running, for all possible inputs to the program. As a first example, the following program is annotated with an assertion about the program state at the end (e.g., a post-condition state), indicating that the output O must be an even number:

```
procedure Main(S, I) returns(O) ensures even(O);
{O := (S + S) + (I + I);}
```

In the first example, the verifier 108 may verify that the post-condition "even(O)" holds true for all possible inputs S and I. In contrast, if the calculation "O:=(S+S)+(I+I)" was replaced by "O:=S+I", then the verification result 110 may indicate that the verification failed because for some inputs I and S, the output O could be an odd number.

For a program that generates multiple outputs, the specification of the program may be verified using the multiple outputs by annotating the output method with a precondition, which must be true any time the program code is executed. As a second example:

```
procedure Main( ) {
    var count := 0;
    while(true) invariant even(count)
    {
        count := count + 2;
        WriteOutput(count);
    }
}
procedure WriteOutput(O); // Trusted output
    requires even(O);
```

In the second example, "invariant even(count)" specifies that the output be even for the output to be trusted. The assertion "invariant even(count)" (e.g., a loop invariant) provides information to enable the verifier 108 to verify the program. The verifier 108 may not automatically recognize a valid program as correct if such information (e.g., loop invariant) is not provided. Thus, to enable the verifier 108 to verify the assembly language implementation 116, the high-level language implementation 112 may specify one or more preconditions, post-conditions, loop invariants, or any combination thereof. The preconditions, post-conditions, loop invariants in the high-level language implementation may be in addition to preconditions and post-conditions included in the high-level specification 102.

Writing a Trustworthy Specification

To enable end-to-end verification of a system, two types of specifications, e.g., a hardware specification and a software specification may be used. For the hardware specification, each assembly instruction that may be executed is specified, to enable low-level verification. The hardware specification describes expectations of the instruction (e.g., ADD that sums multiple registers may expect that summing the multiple registers does not cause an overflow), and the effect(s) of the instruction on the system (e.g., ADD writes back the sum of multiple registers to a destination register).

A software specification may include an abstract description of a desired behavior of the corresponding software application. The abstract description may be written modularly in terms of lower-level library specifications. For example, the software specification for the Notary application may describe (i) how the Notary application's state machine advances and (ii) the outputs permitted in each state. To illustrate, the specification may indicate that one output in a particular state is a signed message which is defined for use in RSA signing.

The verification process performed by the verifier 108 may remove implementation code from a trusted computing base (TCB) by proving that the TCB meets a corresponding high-level specification. However, the specification may be part of the TCB, so the specification itself must be verified as being trustworthy. Therefore, the design of a system may start with the specification, apply specification by reference, apply idiomatic specification, and/or apply specification reviews. Thus, the high-level specification 102 may be written before starting the high-level language implementation 112.

The high-level specification 102 may use an idiomatic-type of specification that specifies those feature subsets that are used by the system, e.g., without specifying unused features. For example, a trusted platform module (TPM) may have hundreds of pages of associated documentation. However, a particular system that uses a subset of the functionality of the TPM may specify the subset of functionality of the TPM without specifying functions of the TPM that are not used in the particular system. Writing the high-level specification 102 to include the functions that are used by a system while excluding unused functions may result in a smaller size for the high-level specification 102 (e.g., as compared to if unused functions were included), thereby enabling easier and more accurate human review of the spec.

Various additional techniques may be used to reduce bugs/errors in a specification (e.g., the high-level specification 102). For example, smaller specifications that include functions used by the system may be verified more easily and faster. As another example, specifications written in a more abstract, declarative fashion than implementation code, may make specification bugs both less likely to occur and easier to find when they do occur.

Producing Verifiable Assembly Language

To enable rapid, large-scale software development while verifying software code at a low-level, the specification and the corresponding assembly language may be verified against each other. For example, the high-level specification 102 may be translated into the low-level specification 106, the high-level language implementation 112 may be compiled into the assembly language implementation 116, and the verifier 108 may verify that the assembly language implementation 116 behaves as specified by the low-level specification 106. This enables a high-level language to be used for the high-level implementation 112 without trusting the compiler 114 and without trusting a run-time environment (e.g., which may use various libraries, runtime components, operating system utilities, or the like).

The compiler 114 may or may not be a trusted component. For example, if the compiler 114 is not a trusted component, the compiler 114 may not guarantee that the assembly language implementation 116 corresponds (e.g., with 100% accuracy) to the high-level language implementation 112. The compiler 114 may translate the high-level language implementation 112 and any included proofs into the assembly language implementation 116 which the verifier 108 automatically verifies. Because the assembly language implementation 116 created by the compiler 114 is verified by the verifier 108, the compiler 114 may not be a trusted component. This enables a software developer to add complex features and optimizations without affecting security guarantees. Instead, the verifier 108 may be used to identify bugs in the compiler 114.

The compiler 114 may perform code optimization when converting the high-level language implementation 112 into the assembly language implementation. For example, the following high-level language code may copy one array to another array:

```
while (k < n) invariant 0 <= k <= n ... {
    b[k] := a[k];
    k := k + 1;
}
```

The compiler 114 may generate assembly language code for the above in which the assembly language code does not perform an array bounds check inside the array loop because the invariant 0<=k<=n provides that the index k into each array is within the bounds 0 and n.

Preliminary Verification During Software Development

To reduce the verification burden for software developers, the high-level specification 102 and the high-level language implementation 112 may be written in a software development environment 122 that performs preliminary verification 124. For example, the preliminary verification 124 may verify the high-level language implementation 112 with the high-level specification 102 as the high-level language code is being written. To illustrate, the high-level language development environment may check the code of the high-level language implementation 112 as it is being written (e.g., immediately after it has been written) against the high-level specification, before the high-level language implementation 112 is translated to the verifiable assembly language implementation 116.

In addition, the preliminary verification 124 may perform verification result caching such that edits to the high-level language implementation 112 result in re-verification of the edited code. The software development environment 122 may include an integrated development environment (IDE), such as Visual Studio IDE, to provide near real-time feedback on verification. As a developer enters and edits code for the high-level language implementation 112, the software development environment 122 may identify errors and enable the developer to view a detailed error message associated with each error. For example, selecting an error message may cause a failed precondition to be highlighted and the specific clause of the precondition that the preliminary verification 124 has determined to be unsatisfied. Such detailed feedback may enable the developer to react while the code for the high-level language implementation 112 is being written, rather than trying to correct issues after the high-level language implementation 112 has been written, similar to the difference between post facto spell checking and continuous spell checking. Such a development environment may enable the developer to quickly identify and address bugs, reasoning errors and the like, before the errors are propagated through the code of the high-level language implementation 112. In addition, the developer may be alerted to a potential problem when the preliminary verification 124 requests that the developer provide information to prove that code written for the high-level language implementation 112 matches the high-level specification 102. The developer may provide information, e.g., an inline assertion of an invariant, and the preliminary verification 124 may provide immediate feedback indicating whether the provided information enables the code that was written to be verified against the high-level specification 102.

The software development environment 122 may provide modular verification, where a first file of code can import the interfaces of a previously verified second file of code without causing the code in the second file to be re-verified.

At an inter-developer level, the software development environment 122 may share verification results via a common storage facility, such as a cloud-based storage facility. For example, a developer may change the code, run verification, and submit the changed code. When another developer checks out the code, the code may be verified immediately based on cached results.

The software development environment 122 may include automatic requirement propagation. For example, a user writing the high-level specification 102 may designate a particular function as an autoReq. This designation instructs the software development environment 122 to automatically add pre-conditions to enable the particular function to satisfy the requirements of callees (e.g., other functions that this particular function calls).

Verifying Relational Properties

In addition to functional correctness, the verifier 108 may verify that an application does not provide ("does not leak") information about secret data (e.g., data that is to be kept private or to which there is restricted access), such as private keys. The property of not leaking information about secret data is referred to as non-interference. Suppose that variable S represents secret data inside an application and I represents a public input to the application. As previously discussed, the statement O:=(S+S)+(I+I) satisfies a functional correctness specification, e.g., even(O). However, the output O may enable an outsider (e.g., an unauthorized program) to determine the secret S, e.g., by computing O/2−I. In this example, the secret S is leaked to the outside. In contrast, the statement O:=(S−S)+(I+I), satisfies even(O) but does not provide information about S in the output O because the value stored in O depends on the value in I but is independent of S. To verify that a program does not provide information about secret data, the verifier 108 may analyze multiple executions of a program and compare the outputs of the executions of the program to determine on which values the outputs depend. Suppose that the public input I is passed to all the executions of the program, but the secret S is varied among the executions of the program. If all the executions of the program produce the same output O regardless of S, then O is independent of S and the program does not provide information about S. If at least one execution of the program produces a different output from the remaining executions of the program, then the program may provide information about S. Thus, it is possible to prove that O is independent of S by proving that no two executions of the program produce a different O when given the same I but a different S. Mathematically, the idea is to prove that for all possible pairs of executions (call the two executions in each pair L and R, for left and right), if the public inputs I are equal but the secrets S may be different, then the outputs O may be equal, e.g., $\forall S_L, S_R. I_L=I_R => O_L=O_R$. While the statement O:=(S−S)+(I+I) satisfies the condition, O:=(S+S)+(I+I) does not satisfy the condition (e.g. with counterexample $I_L=I_R=1$ and $S_L=2$ and $S_R=3$).

To determine that an application does not expose secret data, a developer may annotate code with explicit relational annotations. For example, xL may be written as left(x) and xR may be written as right(x):

```
program Test(S, I) returns(O) requires left(I) == right(I);
    ensures left(O) == right(O);
    ensures even(O);
    { O := (S − S) + (I + I); }
```

In this example, the relational precondition left(I)==right (I) instructs the verifier 108 to determine whether IL=IR wherever Test is called, and the relational post-condition left(O)==right(O) instructs the verifier 108 to determine whether IL=IR=>OL=OR. For most of our code, the verifier 108 may leverage existing functional correctness annotations and so the developer may not provide relational annotations. For example, the verifier 108 may use the functional post-condition in the code:

```
program ComputeIpChecksum(I) returns(O) ensures O ==
    IpChecksum(I);
to determine that if IL = IR, then IpChecksum(IL) = IpChecksum(IR), so
OL = OR.
```

Proving Security Properties

Requiring (and verifying) that the output of a program is independent of secret data in the program may be too strict (e.g., impractical and unnecessary) a condition for most real-world systems. Typically, a program may allow limited influence of secret data on the output, such as using a secret key to sign the output. A security policy for such programs may explicitly declassify certain values, such as a signature, so that the signature can be included in the output.

Figure 2:
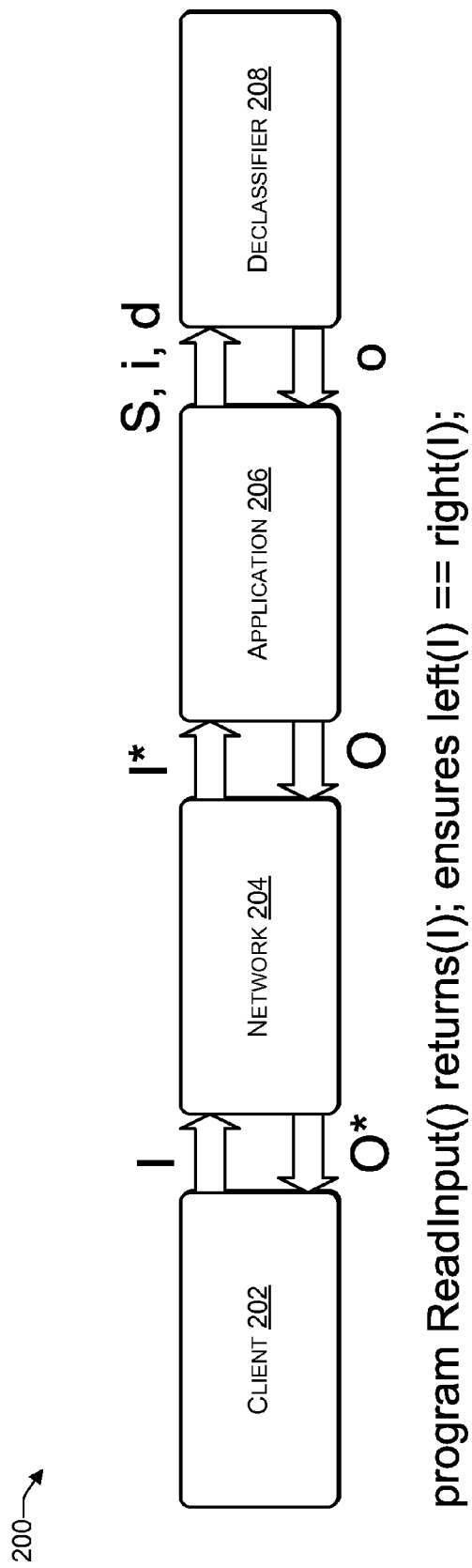
FIG. 2 is an illustrative architecture that includes an application according to some implementations.

FIG. 2 is an illustrative architecture 200 that includes a client, a network, an application, and a declassifier according to some implementations. The architecture 200 illustrates the structure of a verified system, including a client 202, a network 204, an application 206, and a declassifier 208. The declassifier 208 may authorize the release of selected outputs that are derived from secret data. An application's declassification policy may be represented as a state machine that corresponds to the high-level behavior specified by the application's specification. The client 202 may communicate with the (verified) application 206 across the network 204. For example, the client 202 may send input data I over the network 204. The network 204 may drop, delay, duplicate, or mangle the input data I. The network 204 may not have access to the secret data of the application 206. The application 206 may receive a mangled version I* of the input data I and respond by sending output O across the network 204. The network 204 may mangle the output O and provide a mangled version O* to the client.

When computing the output O, the application 206 may invoke the declassifier 208 policy one or more times. Each time the declassifier 208 is invoked, the application 206 may pass secret data S, inputs i, and a desired declassified output d to the declassifier 208. For successful verification, the desired declassified output d will equal the output according to a declassification policy of the state machine that specifies: d=StateMachineOutput(S; i). When the verifier 108 performs static verification and determines that the declassification policy of the state machine is satisfied, the declassifier 208 produces declassified output o that the application 206 can use as part of the output O.

In some implementations, o may equal d, so that the declassifier 208 is a no-op (no operation) during run-time. Nevertheless, the information that the declassifier 208 is a no-op may not be disclosed to the verifier 108, such that oL=oR can be disclosed without disclosing dL=dR. In some cases, e.g., where the secret data S could be determined using brute-force search on d (e.g., by factoring an RSA public key), dL=dR might imply SL=SR, which is undesirable.

Examples of Secure Applications

Four examples of verified secure applications (e.g., referred to as Ironclad applications) are discussed. The proof for each application builds on previously proven lower-level libraries, drivers, and operating systems. Each application may compile to a standalone system image that communicates with other machines via a protocol such as, for example, user datagram protocol (UDP). Each example application is a useful and complete application that could merit at least one dedicated machine in a data center. Hardware support for fine-grained secure execution environments may enable multiplexing multiple Ironclad applications.

Notary Application

The Notary application securely assigns logical timestamps to documents so that the documents may be conclusively ordered. In a conventional system, users of such a timestamp service assume that a machine is executing correct software. The Notary application described herein requires no such assumption.

NOTARY REMOTE EQUIVALENCE. The Notary application is equivalent to a state machine with the following state:

A (PublicKey, PrivateKey) pair is computed using an RSA key generation algorithm from the first consecutive sequence of random bytes read from a TPM.
   A TPM in which a Platform Configuration Register (e.g., PCR 19) has been extended with the public part of the key pair; and
   A counter Counter that is initialized to 0;
and the following transitions:
   Given input (connect, Nonce), the TPM state is changed by obtaining a quote Quote over PCRs 17-19 and external nonce Nonce. Output is (PublicKey; Quote).
   Given input (notarize, Hash), increment Counter and return $\text{Sig}_{PrivateKey}$(OP-CTR-ADV∥RFC4251Encode (Counter)∥Hash).

A PCR is a register that allows secure storage and reporting of security relevant metrics. A portion of the specification for the Notary application may include a predicate that is to be satisfied before out_sig is declassified (which otherwise cannot be output because of dependency on secret data). A simplified example of such a predicate is:

```
datatype NotaryState = NotaryState_c(keys:RSAKeyPair, cntr:nat);
predicate NotarizeOpCorrect( in_st:NotaryState,
out_st:NotaryState,in_msg:seq<int>,
    out_stmt:seq<int>, out_sig:seq<int>)
{
ByteSeq(in_msg)
&& out_st.keys == in_st.keys
&& out_st.cntr == in_st.cntr + 1
&& out_stmt==[OP_COUNTER_ADV]
+ rfc4251_encode(out_st.cntr) + in_msg
&& out_sig==RSASign(in_st.keys, out_stmt)
}
```

Proving Notary Equivalence may include proofs of (1) input non-interference, (2) functional correctness of the program's Connect operation, (3) functional correctness of the program's Notarize operation, and (4) output non-interference. (1) Input non-interference: the nonce and message the Notary application passes to the declassifier 208 are based on public data. (2) Functional correctness of connect: the application derives the key from randomness correctly and the TPM quote the application obtains comes from the TPM when its PCRs are in the required state. (3) Functional correctness of notarize: the app increments the counter and computes the signature correctly. (4) Output non-interference: Writes to unprotected memory depend only on public data and the computed state machine outputs.

TrInc Application

Figure 3:
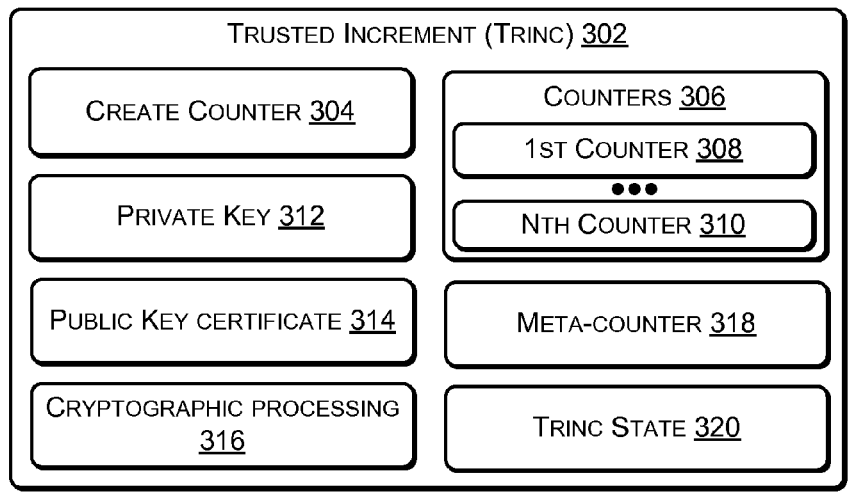
FIG. 3 is an illustrative architecture that includes a trusted increment (TrInc) application according to some implementations.

FIG. 3 is an illustrative architecture 300 that includes a TrInc application 302 according to some implementations.

A trusted-increment application, known as TrInc 302, generalizes the Notary application. TrInc 302 maintains per-user (e.g., per-application) counters, so that each user (e.g., each application) receives consecutive values between which there are no gaps. TrInc 302 is a versatile tool in distributed systems, as TrInc 302 may be used for various functions, such as, for example, tamper-resistant audit logs, Byzantine-fault-tolerant replicated state machines, verifying that an untrusted file server behaves correctly, etc. TrInc 302 may include a create counter 304 module to enable the creation of counters 306. The counter 306 may include N counters (where N>0), such as a first counter 308 to an Nth counter 310. TrInc 302 may include a private key module 312, a public key certificate module 314, a cryptographic processing module 316, a meta-counter 318, and a TrInc state indicator 320.

TRINC REMOTE EQUIVALENCE. The TrInc application 302 is remotely equivalent to a state machine like the Notary application except that TrInc has multiple counters, each a tuple (Ki;vi), and a meta-counter that is initially set to 0. In place of the notarize transition TrInc has:

Given input (create,K),
  set i:=meta_counter,
  increment meta_counter, and
  set (Ki,vi)=(K,0).
Given input (advance; i, $v_{new}$, Msg, UserSig), let $v_{old}$=vi in counter tuple i.
  If vold<=vnew and VerifySig$_{Ki}$($v_{new}$||Msg, UserSig), the set $v_i$:=$v_{new}$ and output Sig$_{PrivateKey}$(OP-CTR-ADV||encode(i)||encode($v_{old}$)||encode($v_{new}$)||Msg).

Password Hashing ("PassHash") Application

A password hashing application may render harmless the loss of a password database. For example, attackers may steal databases and mount offline attacks. Even when a database is properly hashed and salted, low-entropy passwords make the database vulnerable. By using password hashing, unauthorized access to the hashed passwords does not compromise security.

PASSHASH REMOTE EQUIVALENCE. The PassHash application is remotely equivalent to the following state machine. The state consists of a byte string Secret, initialized to the first 32 random bytes read from the TPM. Given input (hash, Salt, Password), the passhash application outputs SHA256(Secret||Salt||Password).

Based on this specification, the hashed passwords are useless to an offline attacker because without the secret, a brute-force guessing attack on even low-entropy passwords is not feasible.

Differential Privacy ("DiffPriv") Service

Figure 4:
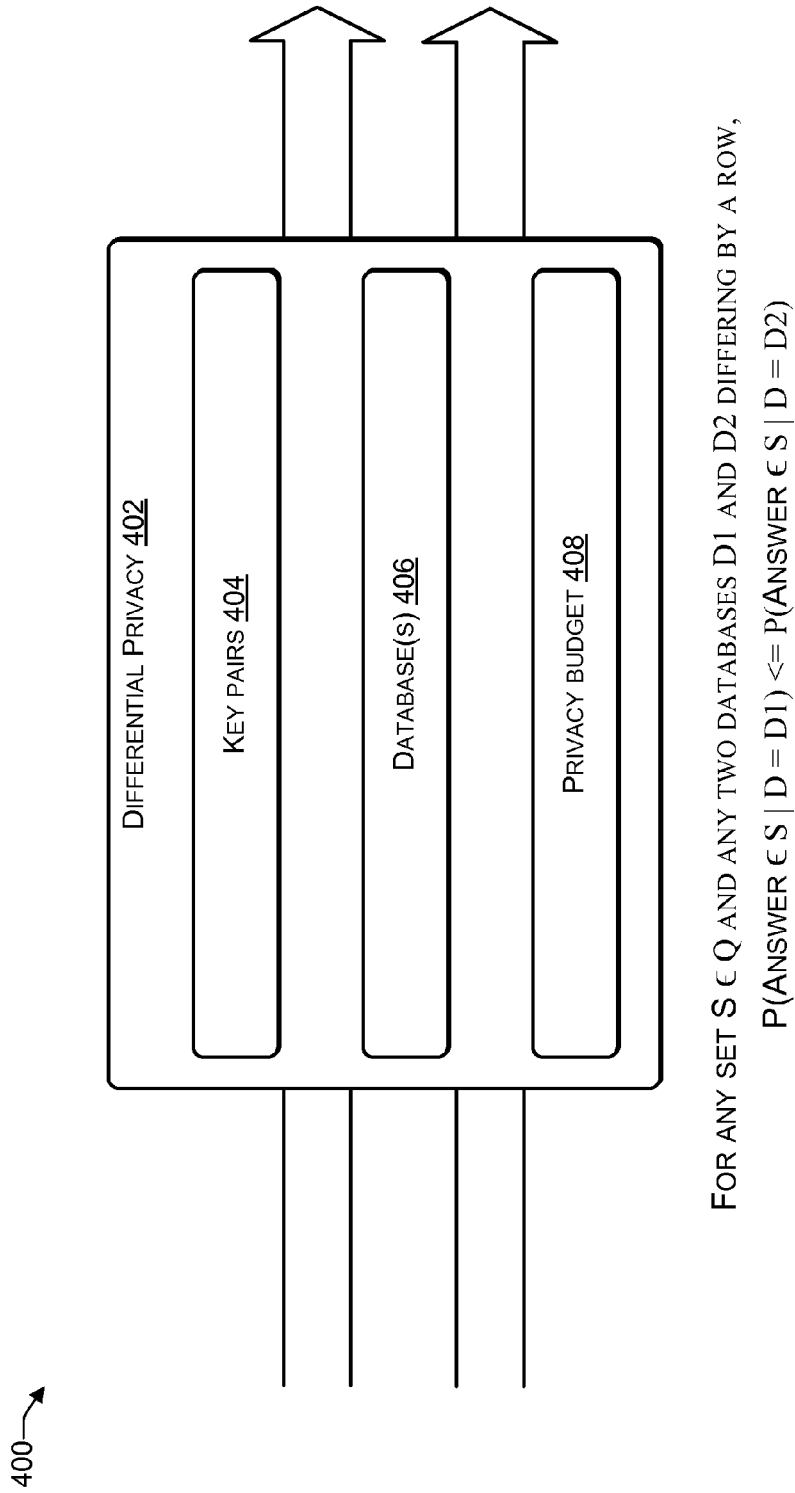
FIG. 4 is an illustrative architecture that includes a differential privacy application according to some implementations.

FIG. 4 is an illustrative architecture 400 that includes a differential privacy application 402 according to some implementations. The differential privacy application 402 may include key pairs 404, one or more database(s) 406, and a privacy budget 408.

The differential privacy application 402 provides a differential privacy service and is an example of a larger application (e.g., compared to TrInc etc.) with a longer and more complex abstract specification. The differential privacy application 402 may collect sensitive data from contributors and allows analysts to study the aggregate database 406. The differential privacy application 402 may guarantee each contributor's differential privacy, e.g., the answers provided to the analyst are virtually indistinguishable from answers that would have been provided if the contributor's data were omitted. An algorithm A is differentially private with privacy $\epsilon$ if, for any set of answers S and any pair of databases $D_1$ and $D_2$ that differ by a single row, $P[A(D_1) \in S]$ $<=\lambda \cdot [A(D_2) \in S]$, where the privacy parameter $\lambda=e^\epsilon$.

Multiple queries with small privacy parameters may be equivalent to a single query with the product of the parameters. Beginning with a privacy budget 408 b=2, guaranteed to contributors, each query Q with parameter $\lambda_Q$ divides the budget b':=b/$\lambda_Q$ (e.g., a query with $\lambda_Q$>b may be rejected). For a noise computation, calculate $\Delta$, the sensitivity of the query, as being the most the query result can change if a single database row changes. The analyst receives the sum of the true answer and a random noise value drawn from a distribution parameterized by $\Delta$. A noise distribution that only includes rational numbers may be used because the noise distribution can be sampled precisely using an instruction set (e.g., the x86 instruction set).

DIFFPRIV REMOTE EQUIVALENCE. The DiffPriv application is remotely equivalent to a state machine with the following state:
  A key pair and TPM are initialized similar to the Notary application;
  a remaining budget b, a real number; and
  a sequence of rows, each consisting of a duplicate-detection nonce and a list of integer column values;
and including transitions that connect to the application, initialize the database, add a row, and perform a query.

SENSITIVITY. The value A used as a sensitivity parameter in a noise computation formula of the specification may be the actual sensitivity of a query result. For example, if we define A(D) as the answer the app computes when the database is D, then for any two databases $D_1$ and $D_2$, $|A(D_1)-A(D_2)|\Delta$.

For verifiablility, queries may be used, where each query is a mapper that transforms a row into a single value, and a reducer that aggregates the resulting set, such that only the reducer affects sensitivity. The analyst can provide an arbitrary mapper; the DiffPriv may provide sensitivity properties for the single reducer sum. The DiffPriv application may take RowMin and RowMax parameters, clipping each mapper output value to a range. For example:

```
predicate DBsSimilar(d1:seq<Row>,d2:seq<Row>)
    |d1| == |d2| &&
    exists diff_row ::
        forall i :: 0 <= i < |d1| && i != diff_row ==> d1[i] == d2[i]
predicate SensitivitySatisfied(prog:seq<Op>, min:int, max:int, delta:int)
    forall d1:seq<Row>, d2:seq<Row> ::
        Valid(d1)&&Valid(d2)&&DBsSimilar(d1, d2) ==>
            –delta <= MapperSum(d1, prog, min, max) –
                MapperSum(d2, prog, min, max)
                <= delta
```

The DiffPriv application is verified to satisfy a predicate that relates reducer output sensitivity to the A used in noise generation.

Full System Verification

Figure 5:
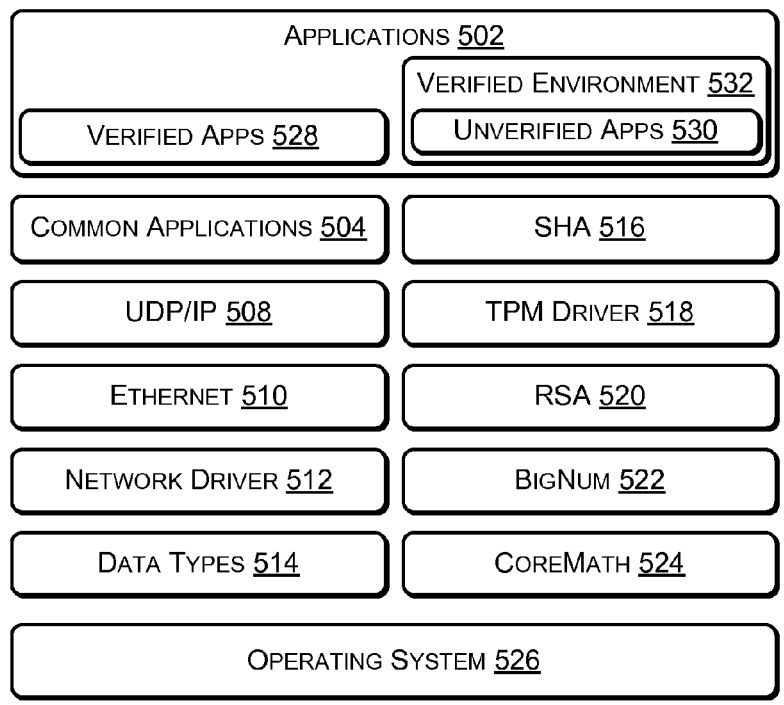
FIG. 5 is an illustrative architecture of a verified software system according to some implementations.

FIG. 5 is an illustrative architecture of a verified software system 500 according to some implementations. The software system 500 includes one or more applications 502, one or more common application libraries 504, a user datagram protocol/internet (UDP/IP) 508 protocol module, an Ethernet 510 protocol module, a network driver 512, one or more data types 514, a Secure Hash (SHA) 516 module, a trusted platform module (TPM) driver 518, an RSA 520 library, a BigNum library 522 (e.g., used to perform cryptographic functions), a CoreMath library 524 (e.g., to perform scientific, engineering, or compute-intensive calculations), and an operating system 526 (e.g., a verified micro-kernel). The applications 502 may include verified applications 528 and unverified applications 530 that are executing in a verified (e.g., sandbox) environment 532.

The applications 502 may include PassHash, Notary, TrInc, DiffPriv, another application or any combination thereof. The operating system 526 may include support for late launch, IOMMU, segmentation, page tables, another operating system utility, or any combination thereof. The software code may include annotations, such as loop invariants, preconditions, and post-conditions to enable verification of the software code. The annotations may be viewed as lemmas that build to high-level theorems.

To illustrate steps for end-to-end verification of the system 500, several propositions are described. These propositions are stated briefly in plain English below for ease of understanding. It should be understood that the actual propositions may take the form of annotations in the high-level language implementation 112. The propositions described below are several key propositions that may be used when verifying the system 500.

IOMMU CONFIGURATION. Verified applications (e.g., Ironclad applications) may configure an input-output memory management unit (IOMMU) to divide memory into device-accessible and application exclusive private memory such that non-device operations access application exclusive private memory. The assembly language instruction specification may be used to determine that non-device memory operations only access application exclusive private memory that has been protected by the hardware's device exclusion vector, a simple IOMMU.

Some central processing units (CPUs) may provide a feature such as dynamic root-of-trust for measurement (DRTM), also known as late launch. The DRTM may reset the CPU to a known state, store a measurement (e.g., a hash code) of the in-memory code pointed to by an argument of an instruction, and jump to that code. After a late launch, the hardware may provide a software program control of the CPU along with 64 kilobytes (KB) of protected memory. To use more than 64 KB, the software program may first extend the IOMMU's protections, based on a specification associated with the configuration of the IOMMU. After extending the IOMMU's protections, the program may satisfy the preconditions for assembly language instructions to access memory outside the 64 KB region.

DEVICES SEE NO SECRET DATA, e.g., only non-secret data may be passed to devices. The assembly language instruction specifications may indicate that storing data to device-accessible memory, i.e., memory that the IOMMU allows devices to access, can only store non-secret data O (e.g., $O_L=O_R$). More specifically, the left and right executions may generate the same sequence of device stores: the same values to the same addresses, modulo timing and liveness. Informally, liveness is a requirement that "something good eventually happens" in a system or an algorithm (i.e., the system "makes progress"). Eventual consistency of a database is an example of a liveness property.

To prove $O_L=O_R$, the implementation code's input paths and output paths may be annotated with relational annotations. The input paths and output paths may include application event loops and a networking stack. For example, Ethernet, internet protocol (IP), and UDP layers may maintain relational properties on packets.

KEY IN TPM. Applications may correctly extend a public key into a TPM's PCR (e.g., PCR 19). The private key may be generated using TPM randomness and never leave the platform.

ATTESTATION. Applications may generate a correct TPM attestation after extending their public key into a PCR.

Corollary 2—SECURE CHANNEL. If a client receives a public key and an attestation, and the attested PCR code values (e.g., PCR 17, PCR 18) match those of a verified application, and the attested PCR data values (e.g., PCR 19) match the public key, and a certificate shows the attestation is from a legitimate hardware TPM manufacturer, then the client may use the public key to establish a secure channel directly to the verified application.

Cryptographic Libraries

HASHING. The SHA 514 may conform to various standards (e.g., FIPS 180-4 and FIPS 198-1).

RSA OPERATIONS. RSA 518 may generate RSA keys using consecutive randomness from the TPM (e.g., not selectively sampled), and pass a primality test (e.g., the Miller-Rabin primality or similar test). RSA 518 may include RSA encrypt, RSA decrypt, RSA sign, and RSA verify, including padding, and may produce byte arrays that conform to standards (e.g., PKCS 1.5 and RSA standards).

For some types of cryptographic primitives, such as hash functions, the verifier 108 may verify functional correctness. The RSA specification, derived from RFC 2313, defines encryption and signature operations as modular exponentiation on keys made of ideal integers. The key-generation specification may use a key that is derived from two random primes. The BigNum 520 library may be used to implement cryptographic primitives. The BigNum 520 library may implement arbitrary-precision integers using arrays of 32-bit words, provide operations such as division and modulo that are used for RSA, etc. The BigNum 520 library may include BigRat which extends the provided operations to rational numbers, which may be used for differential privacy.

BIGNUM/BIGRAT CORRECTNESS. Each BigNum/BigRat operation may produce a value representing a correct infinite-precision integer or real number.

In some implementations, the compiler 114 may not be included in the trusted computing base (TCB). If the compiler 114 is not a part of the TCB, the assembly language implementation 116 may be verified by the verifier 108. The verifier 108 may use several invariants produced by the compiler 114, such as type safety, array bounds safety, and transitive stack safety.

TYPE SAFETY. The contents of every value and heap object may be verified to accurately represent the expected contents according to a type system used by the high-level language, such that operations on every value and heap object does not cause run-time type errors.

ARRAY BOUNDS SAFETY. Array operations may use an index that is within the bounds of the array.

TRANSITIVE STACK SAFETY. When a particular program is called, a stack has enough stack space remaining for the stack operations invoked by the particular program and any additional programs that the particular program may call. The stack may include a data structure to store information about a program. For example, when a program calls a sub-program (e.g., a subroutine) a snapshot of the program may be stored in the stack just before the sub-program is called. For example, the snapshot may include values of variables used by the program, etc. When the sub-program has completed executing, a state of the program may be restored using the snapshot stored in the stack so that execution of the program may resume.

Even if a high-level language is a type-safe language, the verifier 108 may not assume that the compiler 114 preserves type safety. Thus, the verifier 108 may verify type safety at the assembly language level by establishing type invariants for data structures that represent high-level language values. For example, pointers in data structures may point to values of an expected type, and arbitrary integers may not be used as pointers. Such type invariants may be maintained throughout the assembly language code and may be present in loop invariants, preconditions, post-conditions, or any combination thereof. Thus, an external assembly language type checker may not be used to check compiled assembly language implementation 116. Instead, a single verification process (e.g., performed by the verifier 108) may be used for both manually-written assembly language code and compiled code (e.g., the assembly language implementation 116).

HIGH-LEVEL PROPERTY PRESERVATION. Every program proves that an output stack state and registers satisfy high-level language post-conditions given high-level language preconditions. The compiler 114 may maintain high-level language annotations, such as preconditions, post-conditions, and loop invariants. Furthermore, the compiler 114 may connect the high-level annotations to low-level stack and register values, so that operations on stack and register values satisfy correctness theorems associated with the high-level language implementation 112 and the corresponding high-level specification 102.

OPERATING SYSTEM INVARIANTS. Operating system data structure invariants may be maintained.

GARBAGE COLLECTION CORRECTNESS. A memory manager of the operating system 526 may create representations of objects in the high-level language that conform to the semantics of the high-level language. A garbage collector of the operating system 526 may maintain correct object data, and may not leave dangling pointers, even when the garbage collector moves objects around in memory. The garbage collector may reclaim garbage that is stored in memory, e.g., objects in memory that have been allocated but are no longer in use. For example, if a system does not have any pointers that point to an allocated portion of memory, the allocated portion of memory may be reclaimed by the garbage collector for use by another program.

Figure 6:
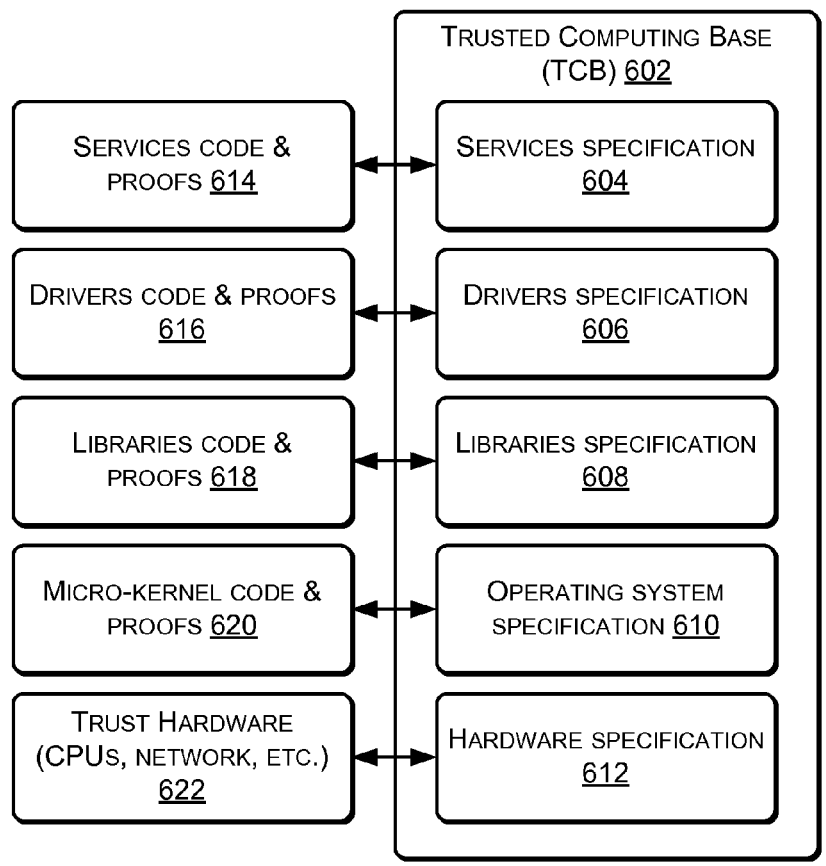
FIG. 6 is an illustrative architecture of a trusted computing base (TCB) according to some implementations.

FIG. 6 is an illustrative architecture 600 that includes a trusted computing base (TCB) 602 according to some implementations. The specifications for the various components of the TCB 602 may include a services specification 604, one or more driver specifications 606, one or more library specifications 608, an operating system specification, and a hardware specification 612, or any combination thereof. The services specification 604 may provide a specification for services provided by the TCB 602, such as input/output operations, communication utilities, file system manipulation utilities, resource allocation utilities, etc. The drivers specification 606 may specify the function of various drivers provided by the TCB 602. The libraries specification 608 may specify the function of various libraries, such as runtime libraries, provided by the TCB 602. The operating system specification 610 may specify the operations associated with an operating system provided by the TCB 602. The hardware specification 612 may provide information regarding the operation of the hardware.

A verifier (e.g., the verifier 108 of FIG. 1) may use the proofs to verify that the software code conforms to the specifications 604, 606, 608, 610, and 612. For example, the verifier may verify that services code and proofs 614 conform to the services specification 604, drivers code and proofs 616 conform to the drivers specification 606, libraries code and proofs 618 conform to the libraries specification 608, micro-kernel (e.g., operating system) code and proofs 620 conform to the operating system specification 610, and trusted hardware conforms to a hardware specification 612.

Example Processes

Figure 7:
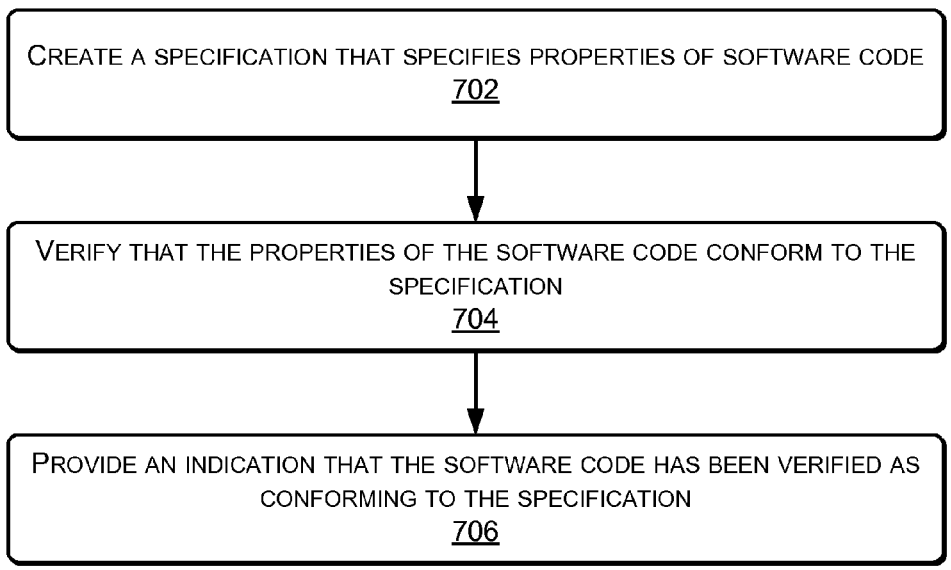
FIG. 7 is a flow diagram of an example process that includes determining properties associated with software code according to some implementations.
Figure 9:
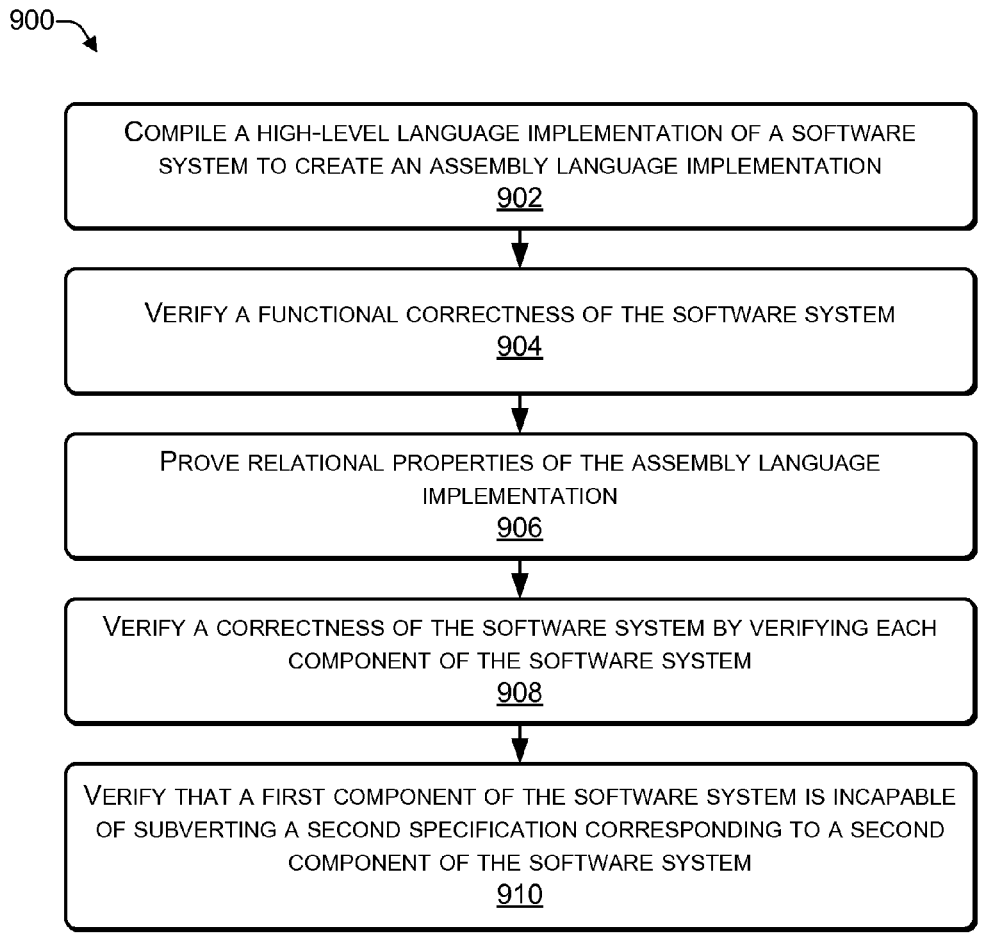
FIG. 9 is a flow diagram of an example process that includes performing a preliminary verification according to some implementations.

In the flow diagrams of FIGS. 7, 8, and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800 and 900 are described with reference to the architectures 100, 200, 300, 400, or 500, as described above, although other models, frameworks, systems and environments may implement these processes.

FIG. 7 is a flow diagram of an example process 700 that includes determining properties associated with software code according to some implementations. The process 700 may be performed by one or more components of software development environment, such as the software development environment 122 of FIG. 1.

At 702, a specification that specifies properties of software code may be created. For example, in FIG. 1, the high-level specification 102 may specify properties of the high-level language implementation 112, such as how the high-level language implementation 112 behaves.

At 704, the properties of the software code may be verified as conforming to the specification. At 706, an indication that the software code has been verified as conforming to the corresponding specification may be provided. For example, in FIG. 1, the verifier 108 may verify that the assembly language implementation 116 conforms to the low-level specification 106. To illustrate, the verifier 108 may compare the behavior of a finite state machine (e.g., the low-level specification 106) with the behavior of the assembly language implementation 116 and determine, given input(s) X, whether both the finite state machine and the assembly language implementation 116 enter a same state. If the verifier 108 determines that the finite state machine and the assembly language implementation 116 enter the same state after being given input(s) X, the verifier 108 may indicate that the assembly language implementation 116 has passed verification. If the verifier 108 determines that the finite state machine and the assembly language implementation 116 enter different states after being given input(s) X, the verifier 108 may indicate that verification failed.

Thus, a verifier may perform verification to determine whether assembly language code conforms to a low-level specification, such as a finite state machine.

FIG. 8 is a flow diagram of an example process that includes verifying that the properties of the software code conform to a corresponding specification according to some implementations. The process 800 may be performed by one or more components of software development environment, such as the software development environment 122 of FIG. 1.

At 802, a preliminary verification may be performed to verify that a high-level language implementation conforms to a high-level language specification. For example, in FIG. 1, the preliminary verification 124 may check the code of the high-level language implementation 112 as it is being written (e.g., immediately after it has been written) against the high-level specification 102, e.g., before the high-level language implementation 112 is translated to the verifiable assembly language implementation 116.

At 804, the high-level language implementation may be compiled to create an assembly language implementation. For example, in FIG. 1, the compiler 114 may create the assembly language implementation 116 by compiling the high-level language implementation 112. The high-level language implementation 112 may be a single application, two or more applications, or an entire software system (e.g., including applications, drivers, libraries, an operating system, and the like).

At 806, a high-level specification may be translated into a low-level specification. For example, in FIG. 1, the high-level specification 102 may be translated by the specification translator 104 to create the low-level specification 106. The low-level specification 106 may include at least one finite state machine whose behavior is based on the high-level specification 102.

At 808, properties of the assembly language implementation may be verified to conform to the low-level specification. For example, in FIG. 1, the verifier 108 may verify that the assembly language implementation 116 conforms to the low-level specification 106. To illustrate, the verifier 108 may compare the behavior of a finite state machine (e.g., the low-level specification 106) with the behavior of the assembly language implementation 116 and determine, given a particular input, whether both the finite state machine and the assembly language implementation 116 enter a same state. If the verifier 108 determines that the finite state machine and the assembly language implementation 116 enter the same state, the verifier 108 may indicate that the assembly language implementation 116 has passed verification. If the verifier 108 determines that the finite state machine and the assembly language implementation 116 enter different states, the verifier 108 may indicate that verification failed.

At 810, a machine code implementation that is based on the assembly language implementation may be created using an assembler. For example, in FIG. 1, the assembler 118 may create the machine code implementation 120 based on the assembly language implementation 116.

Thus, a high-level language development environment may provide various tools. For example, a high-level language implementation and a high-level language specification may be specified at substantially the same time and a preliminary verification may be performed to verify that the high-level language implementation conforms to the high-level language specification. The high-level specification may be translated into a low-level specification, such as a finite state machine, and the high-level language implementation may be compiled to an assembly language implementation. A verifier may verify that the behavior of the assembly language implementation conforms to the low-level specification. By doing so, an entire software system that includes applications, libraries, drivers, an operating system, and the like may be verified to perform according to the high-level specification of the software system.

FIG. 9 is a flow diagram of an example process that includes performing a preliminary verification according to some implementations. The process 900 may be performed by one or more components of software development environment, such as the software development environment 122 of FIG. 1.

Example Computing Device and Environment

Figure 10:
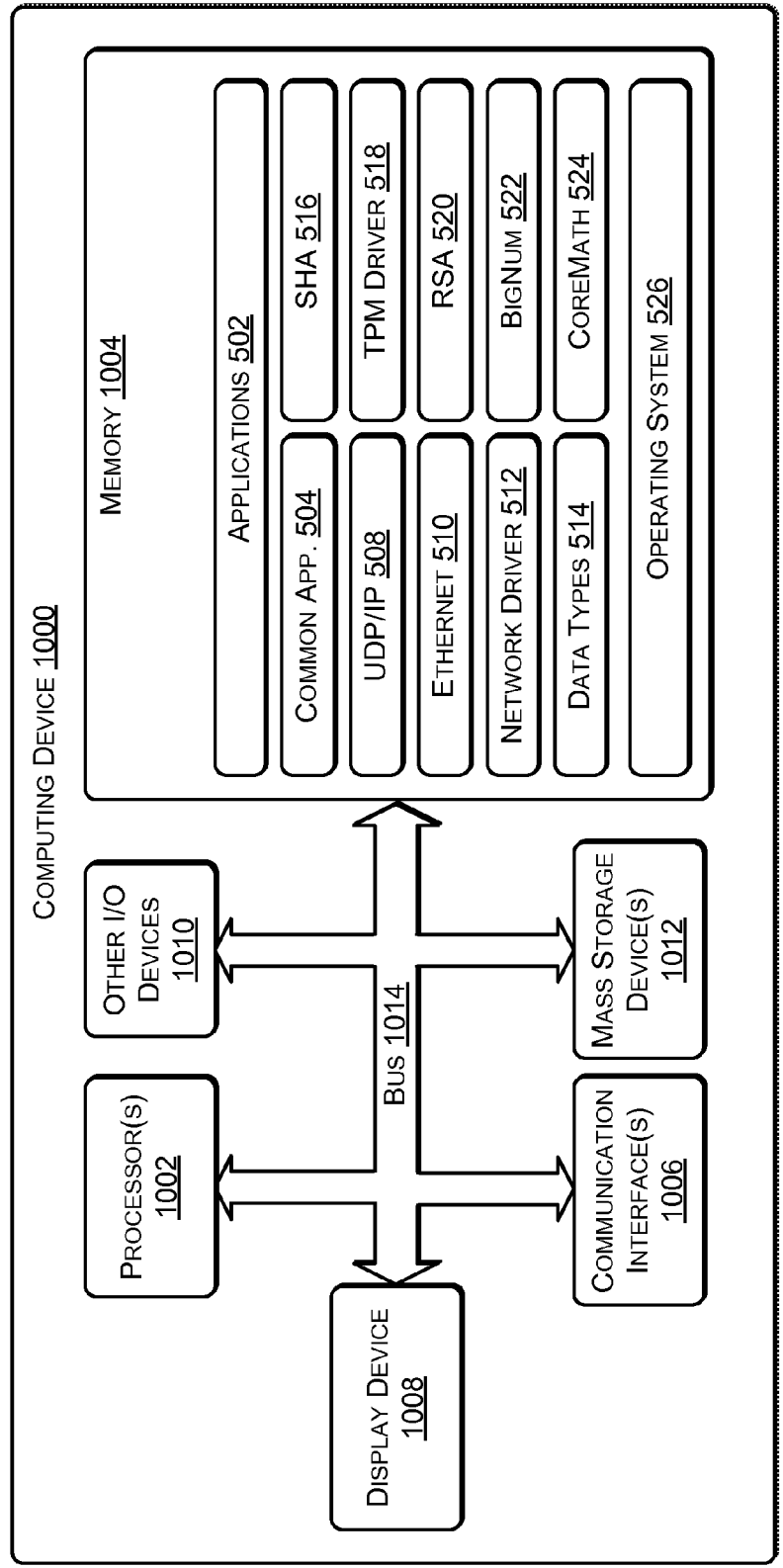
FIG. 10 is an illustrative architecture that includes a verified software system.

FIG. 10 illustrates an example configuration of a computing device 1000 and environment that can be used to implement the modules and functions described herein. The computing device 1000 may include at least one processor 1002, a memory 1004, communication interfaces 1006, a display device 1008, other input/output (I/O) devices 1010, and one or more mass storage devices 1012, able to communicate with each other, such as via a system bus 1014 or other suitable connection.

The processor 1002 may be a single processing unit or a number of processing units, all of which may include single or multiple computing units or multiple cores. The processor 1002 can be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions stored in the memory 1004, mass storage devices 1012, or other computer-readable media.

Memory 1004 and mass storage devices 1012 are examples of computer storage media for storing instructions which are executed by the processor 1002 to perform the various functions described above. For example, memory 1004 may generally include both volatile memory and non-volatile memory (e.g., RAM, ROM, or the like). Further, mass storage devices 1012 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be a non-transitory media capable of storing computer-readable, processor-executable program instructions as computer program code that can be executed by the processor 1002 as a particular machine configured for carrying out the operations and functions described in the implementations herein.

The computing device 1000 may also include one or more communication interfaces 1006 for exchanging data with other devices, such as via a network, direct connection, or the like, as discussed above. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like. Communication interfaces 1006 can also provide communication with external storage (not shown), such as in a storage array, network attached storage, storage area network, or the like.

A display device 1008, such as a monitor may be included in some implementations for displaying information and images to users. Other I/O devices 1010 may be devices that receive various inputs from a user and provide various outputs to the user, and may include a keyboard, a remote controller, a mouse, a printer, audio input/output devices, and so forth.

Memory 1004 may include modules and software components that can be used to create a verified software system. For example, in a software system that has been verified, the memory 1004 may include the applications 502, the common applications 504, UDP/IP 508, Ethernet 510, network driver 512, data types 514, SHA 516, TPM driver 518, RSA 520, BigNum 522, CoreMath 524, and operating system 526. In a software development system, the memory 1004 may also include, from FIG. 1, the high-level specification 102, the specification translator 104, the low-level specification 106, the verifier 108, the verification result 110, the high-level implementation 112, the compiler 114, the assembly language implementation 116, the assembler 118, and the machine code implementation 120.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically eraseable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations," "an example," "some examples," "some implementations" or the like means that a particular feature, structure, or characteristic described is included in at least one implementation or example, and the appearances of these phrases in various places in the specification are not necessarily all referring to the same implementation. Unless otherwise indicated, the various implementations and examples provided are not intended to be mutually exclusive and may be used individually or in combination with one another.

EXAMPLES

A specification may be created that includes properties of a software stack comprising one of more applications, one or more device drivers, and an operating system. The properties of the software stack may be verified as conforming to the specification. An indication that the software stack has been verified as conforming to the specification may be provided. A proof may be provided that the properties of the software stack conform to the specification. For example, the proof may prove a functional correctness of the software stack. As another example, the proof may prove relational properties of the software stack. The specification may comprise a high-level specification that is expressed as a finite state machine The high-level language code may be compiled to assembly language code. The properties of the assembly language code may be verified to conform to the specification. The specification may be translated to a low-level specification before verifying that the properties of the software code conform to the specification. A high-level language implementation of a software system may be compiled to create an assembly language implementation. A high-level specification corresponding to the software system may be translated to a low-level specification. Properties of the assembly language implementation may be verified as conforming to the low-level specification. A machine code implementation may be created based on the assembly language implementation. The machine code implementation may be executed on trusted or secure hardware, such as a trusted hardware platform. A preliminary verification may be performed to verify that the high-level language implementation conforms to the high-level specification. The high-level specification may be expressed as at least one finite-state machine Verifying that properties of the assembly language implementation conform to the low-level specification may include determining that the assembly language implementation implements a functionally correct version of the low-level specification. A component of the software system may be verified as being incapable of subverting other components of the software system. A high-level language implementation of a software system may be compiled to create an assembly language implementation. The software system may include an operating system, one or more drivers, and one or more applications. A functional correctness of the software system may be verified. Relational properties of the assembly language implementation may be verified. Verifying the functional correctness of the software system may include verifying information flow properties of the software system. An attestation may certify that: (1) a public key corresponds to a private key, and (2) the private key is known only to the verified software system. A correctness of the software system may be verified by verifying each component of the software system. The assembly language implementation of the software system may comprise a single software program that is verified as a whole. A first component of the software system may be verified as being incapable of interfering with a second specification of a second component of the software system. Remote equivalence of the software system may be demonstrated.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification.

What is claimed is:

1. A computer-implemented method comprising:
   receiving software code written in a high-level language, the software code comprising multiple components including an operating system and at least one application;
   compiling the software code to create assembly language code corresponding to the software code;
   receiving a high-level specification specifying one or more functions performed by the software code;
   generating a low-level specification based at least in part on the high-level specification;
   verifying that an output of the assembly language code does not enable secret data to be determined, the secret data comprising one or more private keys;
   verifying that the assembly language code behaves in accordance with the low-level specification to perform the one or more functions specified by the high-level specification; and
   providing an indication that the assembly language code has been verified to perform the one or more functions.

2. The computer-implemented method of claim 1, further comprising:
   verifying that a first component of the multiple components is incapable of subverting a second component of the multiple components.

3. The computer-implemented method of claim 1, further comprising:
   verifying an equivalence between an individual component of the multiple components and a corresponding state machine in the low-level specification.

4. The computer-implemented method of claim 1, wherein:
   the high-level specification includes:
      at least one of a pre-condition, a post-condition, or a termination metric; and
      one or more assertions identifying states associated with the software code; and
   the computer-implemented method further comprises:
      verifying a validity of the one or more assertions.

5. The computer-implemented method of claim 1, wherein:
   the software code includes an assertion regarding a plurality of states entered into by the software code.

6. The computer-implemented method of claim 5, wherein verifying that the assembly language code performs the one or more functions comprises:
   proving that the assertion regarding the plurality of states entered into by the software code is valid for all possible inputs.

7. The computer-implemented method of claim 1, wherein:
   the high-level specification comprises an idiomatic specification specifying feature subsets used by the software code.

8. The computer-implemented method of claim 1, further comprising:
   optimizing the assembly language code, the assembly language code using an intermediate verification language to describe proof obligations;
   generating, by a verification engine, one or more verification conditions corresponding to the proof obligations based at least in part on the assembly language code; and
   verifying, by a reasoning engine, the proof obligations.

9. A computing device comprising:
   one or more processors; and
   one or more memory storage devices to store instructions executable by the one or more processors to perform operations comprising:
      receiving software code written in a high-level language, the software code comprising multiple components;
      compiling the software code to create assembly language code corresponding to the software code;
      receiving a high-level specification specifying one or more functions performed by the software code;
      generating a low-level specification based at least in part on the high-level specification;
      verifying that an output of the assembly language code prevents secret data from being determined, the secret data comprising one or more private keys;
      verifying that the assembly language code behaves in accordance with the low-level specification to perform the one or more functions specified by the high-level specification; and
      providing an indication that the assembly language code has been verified to perform the one or more functions.

10. The computing device of claim 9, wherein the operations further comprise:
    receiving a line of the software code; and
    verifying the line of the software code against the high-level specification.

11. The computing device of claim 9, wherein the operations further comprise:
    receiving a line of the software code that performs at least one function of the one or more functions; and
    determining that the line of the software code fails to perform the at least one function; and
    displaying an error message in which a failed precondition of the high-level specification is highlighted.

12. The computing device of claim 9, wherein the operations further comprise:
    receiving an edited portion of the software code that performs at least one function of the one or more functions; and
    re-verifying that the edited portion of the software code performs the at least one function of the one or more functions.

13. The computing device of claim 9, wherein the operations further comprise:
    receiving a first file of the software code, the first file referencing an interface of a second file of the software code that was previously verified; and
    importing the interface of the second file of the software code without re-verifying the second file.

14. The computing device of claim 9, wherein the operations further comprise:
    verifying that a first component of the multiple components is incapable of subverting a second component of the multiple components.

15. The computing device of claim 9, wherein the operations further comprise:
   analyzing multiple executions of a software application included in the software code;
   comparing multiple outputs corresponding to the multiple executions; and
   determining dependencies for all possible pairs of executions.

16. One or more memory storage devices to store instructions executable by one or more processors to perform operations comprising:
   receiving software code written in a high-level language, the software code comprising multiple components;
   compiling the software code to create assembly language code corresponding to the software code;
   receiving a high-level specification specifying one or more functions performed by the software code;
   generating a low-level specification based at least in part on the high-level specification;
   verifying that an output of the assembly language code does not enable secret data to be determined, the secret data comprising one or more private keys;
   verifying that the assembly language code behaves in accordance with the low-level specification to perform the one or more functions specified by the high-level specification; and
   providing an indication that the assembly language code has been verified to perform the one or more functions.

17. The one or more memory storage devices of claim 16, wherein the operations further comprise:
   proving a functional correctness of the software code; and
   proving relational properties of the software code.

18. The one or more memory storage devices of claim 16, wherein the high-level specification is expressed as at least one finite state machine.

19. The one or more memory storage devices of claim 16, wherein the operations further comprise:
   determining that the assembly language code implements a functionally correct version of the low-level specification.

20. The one or more memory storage devices of claim 16, wherein the operations further comprise:
   verifying a correctness of the software code by verifying each component of the multiple components, including verifying that a first component of the multiple components does not subvert other components of the multiple components.

* * * * *